July 31, 1923.
A. L. POWELL
1,463,751
MECHANICAL IGNITER
Original Filed Feb. 2, 1921
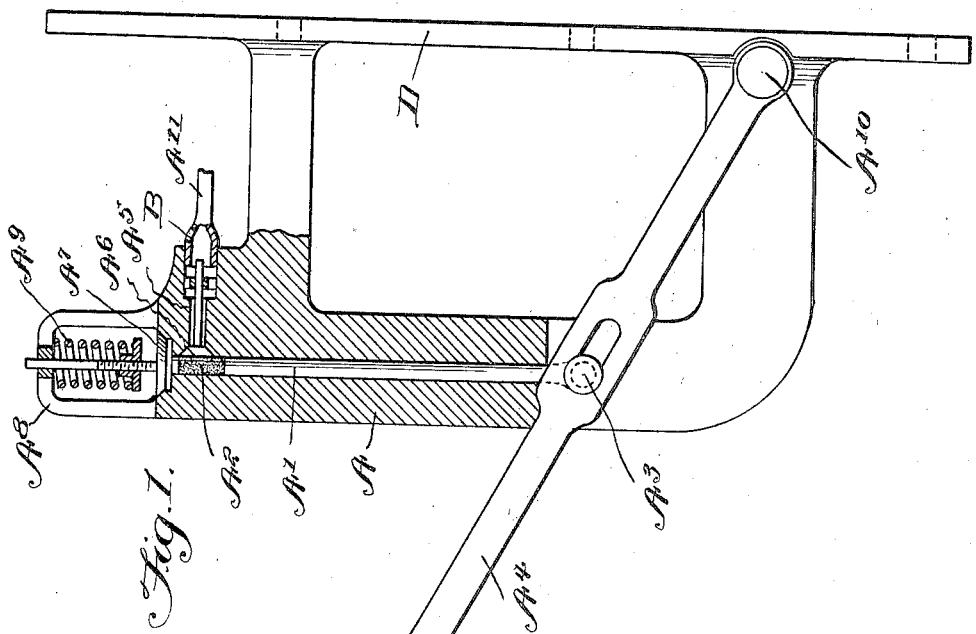
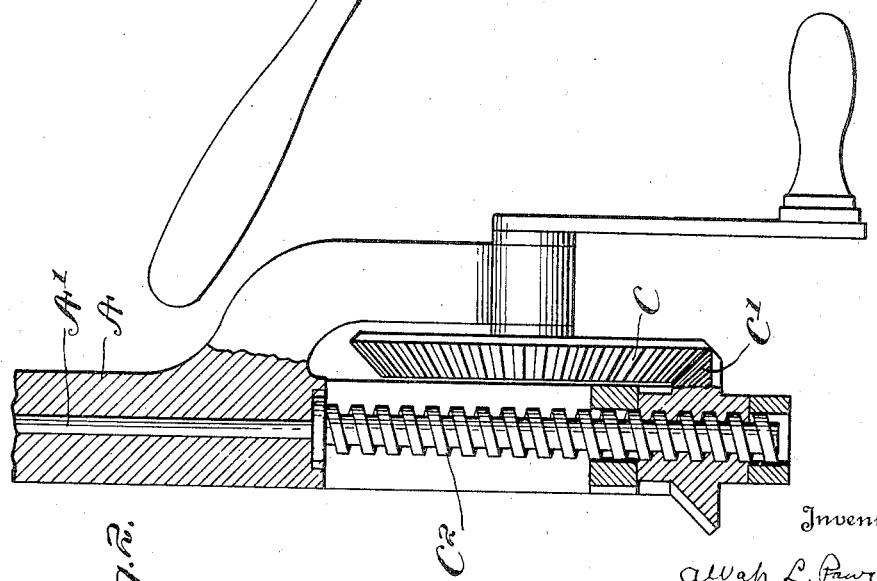
Inventor
Alvah L. Powell Patented July 31, 1923.

1,463,751

UNITED STATES PATENT OFFICE.

ALVAH L. POWELL, OF MILES CITY, MONTANA, ASSIGNOR TO THE A. L. POWELL POWER CO., INC., OF MILES CITY, MONTANA, A BODY CORPORATE.

MECHANICAL IGNITER.

Application filed February 2, 1921, Serial No. 441,979. Renewed December 22, 1922.

*To all whom it may concern:*

Be it known that I, ALVAH L. POWELL, citizen of the United States, residing at Miles City, in the county of Custer and State of Montana, have invented certain new and useful Improvements in Mechanical Igniters, of which the following is a specification.

My invention relates to improvements in mechanical igniters in which I obtain sufficient heat to ignite oil, or pieces of inflammable material, by the effect of air compressed to a point where the heat induced is sufficient to cause combustion. In the annexed drawings I show a form of my invention, intended particularly for household use.

Fig. 1 is an elevation, partly in section.

Fig. 2 is a sectional elevation of a modification.

In Fig. 1, a frame, A, is bored to fit a plunger of relatively small diameter, $A^1$. On one end of said plunger a packing disc, $A^2$, is preferably placed to insure tightness. On the other end of plunger a pin, $A^3$, is fitted that connects with a slotted lever, $A^4$, as shown. The said lever is pivoted at $A^{10}$. Near the free end of $A^1$ there is a hole at right angles to it, $A^5$, in which is a check valve, $A^6$. A pipe, $A^{11}$, communicates with any convenient fuel supply. On end of casting A there is fitted a check valve $A^7$, the stem of which passes through a guide hole in yoke $A^8$. A spring, $A^9$, holds $A^7$ to its seat and is set to resist a high pressure on the said valve.

To operate the igniter the lever $A^4$ is depressed. This draws plunger $A^1$ downward and a suction effect is produced above it. Valve $A^6$ unseats and admits a small quantity of fuel and air through air vent B. Lever $A^4$ is then raised. Compression results and the temperature of the fuel and air is raised. At a point near end of stroke ignition results and the pressure is sharply augmented, overcoming the force of spring $A^9$ and lifting valve $A^7$. A flame escapes that may be utilized to light a taper, gas or any inflammable material that has been placed in its path.

In Fig. 2 I show a rotary screw drive for moving plunger $A^1$. The bevel gears C, $C^1$, rotate. $C^1$ is interiorly threaded to fit the thread on $C^2$, and the plunger is moved by the movement of the screw as it feeds forward. In the drawing the parts are shown at end of up stroke.

A bracket is formed on the casting A, as at D, by which the igniter may be attached to a wall, or to any convenient location.

What I believe is new and ask to have protected by Letters Patent is—

1. In a mechanical igniter, a frame, a bored hole in said frame, a piston operable in said bored hole, an inlet valve, an outlet valve, means for holding said outlet valve to resist a pre-arranged pressure, communicating means from said valves to said bored hole, a lever, means for supporting said lever on said frame, a slot in said lever, a pin on said piston, means for operating said piston by said lever, and means for fastening said frame to a supporting surface, substantially as described.

2. In a mechanical igniter, the combination of a frame, means for fastening said frame to a supporting surface, a bored hole in said frame, an inlet valve, an outlet valve, a spring, means for setting said spring to resist a pre-arranged pressure, means whereby said valves communicate with said bored hole, a piston operable in said bored hole, a slotted lever, means for pivoting said lever on said frame, a pin, means whereby said lever is in operative engagement with said piston by the said pin, and means for augmenting the temperature of the contents of said bored hole by compression, substantially as described.

In testimony whereof I affix my signature.

ALVAH L. POWELL.